(12) United States Patent
Bouwmans et al.

(10) Patent No.: US 10,077,162 B2
(45) Date of Patent: Sep. 18, 2018

(54) METHOD FOR EJECTING SHEETS FROM AN OUTPUT HOLDER OF A PRINTING DEVICE

(71) Applicant: OCE-TECHNOLOGIES B.V., Venlo (NL)

(72) Inventors: Peter F. M. Bouwmans, Venlo (NL); Johan Van De Hee, Venlo (NL); Erik J. W. Schoenmakers, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/493,256

(22) Filed: Apr. 21, 2017

(65) Prior Publication Data
US 2017/0217225 A1 Aug. 3, 2017

Related U.S. Application Data

(63) Continuation of application No. PCT/EP2015/075092, filed on Oct. 29, 2015.

(30) Foreign Application Priority Data

Oct. 30, 2014 (EP) .................................... 14191042

(51) Int. Cl.
*B65H 29/00* (2006.01)
*B65H 31/30* (2006.01)
(Continued)

(52) U.S. Cl.
CPC .......... *B65H 29/00* (2013.01); *B41J 13/0009* (2013.01); *B65H 31/30* (2013.01);
(Continued)

(58) Field of Classification Search
CPC .... B65H 29/00; B65H 43/00; B65H 2551/18; B65H 2801/06; G03G 2215/00556;
(Continued)

(56) References Cited

U.S. PATENT DOCUMENTS

2003/0214091 A1  11/2003  Suzuki et al.
2010/0091311 A1   4/2010  Sato et al.
(Continued)

*Primary Examiner* — David H Bollinger
(74) *Attorney, Agent, or Firm* — Birch, Stewart, Kolasch & Birch, LLP

(57) ABSTRACT

The invention relates to a method for ejecting a stack of sheets from an output holder attached to a printing device, the output holder configured to hold a stack of sheets printed upon by the printing device according to a plurality of print jobs submitted to the printing device, the printing device comprising a control unit for controlling the receiving of the plurality of print jobs in a print job queue and the printing of the plurality of print jobs according to the print job queue, the method comprising the steps of receiving a trigger comprising information for an ejection of the stack for another reason than a full output holder, the stack ejection to be performed before the start of the printing of a print job residing in the print job queue or after the print job residing in the print job queue has been printed, and entering a task for the ejection of the stack at a position in the print job queue, the position determining an intended moment in time of the ejection of the stack corresponding to the information comprised in the trigger. The invention also relates to a printing system configured to execute the method according to the present invention.

23 Claims, 9 Drawing Sheets

(51) Int. Cl.
*B65H 39/10* (2006.01)
*G06F 3/12* (2006.01)
*B41J 13/00* (2006.01)
*B65H 43/00* (2006.01)

(52) U.S. Cl.
CPC ............. *B65H 39/10* (2013.01); *B65H 43/00* (2013.01); *G06F 3/1203* (2013.01); *G06F 3/1204* (2013.01); *G06F 3/126* (2013.01); *G06F 3/1264* (2013.01); *G06F 3/1282* (2013.01); *B65H 2301/4213* (2013.01); *B65H 2551/18* (2013.01); *B65H 2801/06* (2013.01)

(58) Field of Classification Search
CPC .......... G03G 2215/00886; G03G 15/65; G06F 3/1296; B41J 13/0009
See application file for complete search history.

(56) References Cited

U.S. PATENT DOCUMENTS

2010/0270725 A1   10/2010  Nakajima
2011/0049784 A1    3/2011  Mandel et al.

METHOD FOR EJECTING SHEETS FROM AN OUTPUT HOLDER OF A PRINTING DEVICE

CROSS REFERENCE TO RELATED APPLICATIONS

This application is a Continuation of PCT International Application No. PCT/EP2015/075092, filed on Oct. 29, 2015, which claims priority under 35 U.S.C. 119(a) to patent application Ser. No. 14/191,042.2, filed in Europe on Oct. 30, 2014, all of which are hereby expressly incorporated by reference into the present application.

FIELD OF THE INVENTION

The present invention relates to a method for ejecting a stack of sheets from an output holder attached to a printing device, the output holder configured to hold a stack of sheets printed upon by the printing device according to a plurality of print jobs submitted to the printing device, the printing device comprising a control unit for controlling the receiving of the plurality of print jobs in a print job queue and the printing of the plurality of print jobs according to the print job queue. A print job is a job for printing at least one document according to a plurality of accompanying settings. A print job may for example comprise a setting determining the number of copies of the at least one document to be printed.

The present invention further relates to a printing system which is configured to apply the method according to the present invention.

BACKGROUND OF THE INVENTION

Nowadays productivity plays an important role in printing systems. Print jobs are printed consecutively by means of a printing device. After printing upon sheets by the printing device the sheets are transported to an output holder attached to the printing device. The output holder may be part of the printing device or coupled to an outlet of the printing device. The output holder has a maximum capacity expressed in a maximum number of sheets in the output holder—mostly media dependent—, expressed in a maximum weight of the amount of sheets in the output holder, and/or expressed in a maximum stack height of the sheets in the output holder. The sheets form a stack of sheets in the output holder.

Two scenarios for ejection of the stack from the output holder are generally known. During a stack ejection the stack of sheets is transported from inside the output holder towards outside the output holder by transporting means. After the stack ejection the empty output holder is ready for receiving the next sheets from the printing device.

In a first scenario the printing device receives print jobs and schedules the received printing jobs in a print job schedule. After each print job has been printed by the printing device and has arrived in the output holder, the sheets of the print job are ejected from the output holder. This way of ejection is often a standard system setting of the printing device.

In a second scenario the printing device or more specifically the output holder comprises a detecting means for detecting that the stack of sheets reaches the maximum capacity and an ejection of the stack is performed.

A combination of both scenarios may as well be implemented. In case of a print job which number of sheets accumulated with the sheets already deposited in the output holder exceeds the maximum capacity of the output holder a stack ejection may be planned before the start of the print job.

Both scenarios have disadvantages. By ejecting sheets from the output holder after each print job according to the first scenario, much time is consumed by the moments of ejection. By only ejecting sheets from the output holder when the output holder has reached its maximum capacity, sheets of a plurality of print jobs are stacked and the sheets may be undistinguishable as distinct jobs in the stack. Additional jogging devices must be configured to distinguish the subsequent print jobs in the stack. When the stack is only ejected when the output holder has reached its maximum capacity, the operator is unable to have a look at the separate print jobs since the stack may be positioned internally in the printing device before ejection.

It is an objective of the present invention to overcome these disadvantages in a user friendly and productive manner.

SUMMARY OF THE INVENTION

According to the present invention the method comprises the steps of receiving a trigger comprising information for an ejection of the stack for another reason than a full output holder, the stack ejection to be performed before the start of the printing of a print job residing in the print job queue or after the print job residing in the print job queue has been printed, and entering a task for the ejection of the stack at a position in the print job queue, the position determining an intended moment in time of the ejection of the stack corresponding to the information comprised in the trigger, wherein the stack is intended to comprise a plurality of print jobs at the intended moment in time of the ejection of the stack.

The print job queue determines a sequence order of printing the print jobs by the printing device. The entered task is incorporated in the print job queue and executed according to the sequence order of the print job queue after or before the print job residing in the print job queue. The entering of the task in the print job queue is automatically executed by the control unit of the printing device.

Due to the fact that the stack comprises a plurality of print jobs at the intended moment of the stack ejection, print jobs may be bundled according to a bundling criterion. Such a bundling criterion may be that the print jobs have to be sent to the same customer, have to be packed in a same box, have to be finished together like sealing, etc.

According to an embodiment the method comprises the steps of printing the print jobs according to the print job queue, and ejecting the stack of sheets according to the entered task in the print job queue.

According to an embodiment the method comprises the step of receiving the trigger from a job submitter for submitting the print job to the printing device. The job submitter may be part of a printer driver or a pre-processing application, like an image preparing application, a pre-press application, or a pre-flight application. The pre-processing application may comprise a hot folder mechanism for receiving document files in a hot folder and automatically retrieving the document files subsequently from the hot folder in order to transmit the document files subsequently to the printing device.

According to an embodiment the method comprises the step of providing first feedback in a window being part of the job submitter regarding the intended moment in time of the ejection of the stack. By giving feedback the user is able to determine if the intended moment in time of the ejection of the stack is well-chosen or has to be changed.

According to an embodiment the provided first feedback comprises information of at least one out of a predetermined number of sheets in the stack at the intended moment in time of ejection of the stack, a predetermined height of the stack at the intended moment in time of ejection of the stack, a predetermined number of print jobs in the stack at the intended moment in time of ejection of the stack, a predetermined number of sets of a print job in the stack at the intended moment in time of ejection of the stack, a predetermined weight of the stack at the intended moment in time of ejection of the stack, a change of a customer name property among the print jobs in the stack at the intended moment of ejection of the stack, and a maximum sheet size of the stack at the intended moment of ejection of the stack.

According to an embodiment the printing device comprises or is connected to a user interface for displaying the print job queue and the method comprises the steps of displaying the print job queue on the user interface, and receiving the trigger from an action applied to the print job queue displayed on the user interface. The action may be a user action or an action automatically generated by a control unit of the printing device.

According to an embodiment the user interface is configured to display a visual representation of the print job queue, the visual representation comprising a plurality of first visual objects, each first visual object representing a print job in the print job queue, and a second visual movable object representing an ejection of a stack, the method comprising the step of determining the intended moment in time of the ejection of the stack based on a relative position of the second visual object and each of the first visual objects.

According to an embodiment the method comprises the step of changing the intended moment in time of the ejection of the stack in the print job queue by moving the second visual object to another position in the print job queue. The movement of the second visual object may be a drag-and-drop movement by a mouse or by means of a touch on a screen of the user interface.

According to an embodiment the user interface is configured to display an eject button and the method comprises the steps of selecting a print job from the print job queue, activating the eject button, entering the task for the ejection of the stack after the selected print job in the print job queue, displaying the second visual movable object in the visual representation of the print job queue after the first visual object representing the selected print job. Mutatis mutandis the task may be entered before the selected print job and the second visual movable object may be displayed in the visual representation of the print job queue before the first visual object representing the selected print job. The terms after and before may be interpreted according to a sequence order being inherent to the print job queue.

According to an embodiment the method comprises the step of providing second feedback regarding the changing of the intended moment in time of the ejection of the stack. By changing the intended moment in time of ejection of the stack other constraints of the printing device and/or opportunities of the print job queue may be triggered. The user receives the second feedback regarding these constraints and/or opportunities on a screen of the user interface.

According to an embodiment the provided second feedback comprises information of at least one out of a predetermined number of sheets in the stack at the intended moment in time of ejection of the stack, a predetermined height of the stack at the intended moment in time of ejection of the stack, a predetermined number of print jobs in the stack at the intended moment in time of ejection of the stack, a predetermined number of sets of a print job in the stack at the intended moment in time of ejection of the stack, a predetermined weight of the stack at the intended moment in time of ejection of the stack, and a change of a customer name property among the print jobs in the stack at the intended moment of ejection of the stack.

According to an embodiment the trigger is a print job ticket comprising a setting for ejection of a stack having a value out of a first value of an ejection of the stack before the printing of the print job, a second value of an ejection of a stack after the printing of the print job, a third value of no ejection of the stack, and a fourth value of an unspecified stack ejection. The fourth value of an unspecified ejection of the stack may be added to the set of values for the setting when a rule based system is used by the printing device comprising rules for stack ejection.

According to an embodiment method comprises the step of receiving the trigger from a local user interface being part of the output holder. A stack ejection request for immediate stack ejection may be entered on the local user interface of the output holder. The running print job is executed until the end of the print job. After the receipt of the sheets of the executed print job on the stack, the stack is ejected.

According to an embodiment the method comprises the step of receiving the trigger from a rule based system comprising ejection rules derived from properties of the print jobs residing in the print job schedule. The rule based system may reside in the control unit of the printing device or in a computer for receiving a submitted print job, the computer connected to the printing device via a data communication network.

According to an embodiment each ejection rule of the rule based system has a setting out of an activation option of the rule, a deactivation option of the rule and an advice option of the rule, wherein the user interface provides an advice for an ejection of the stack if the setting of the advice option is set for the rule. In the latter case the advised stack ejection is executed as soon as the advice is affirmed by the operator by means of the appropriate user interface.

According to an embodiment the rule based system supports an ejection rule that an ejection is to be scheduled between a first print job to be printed before a second print job, the first print job having a smaller format than the second print job. By building "pyramidal" stacks, a moment in time of an ejection of the stack may be selected between the moment in time when a "pyramidal" stack has been formed and the moment in time when a new "pyramidal" stack is started to be formed. A "pyramidal" stack may be defined as a stack which dimensions in the other dimensions than the stack height are decreasing from the bottom of the stack towards to the top of the stack.

According to an embodiment the rule based system supports an ejection rule that an ejection is to be scheduled between a first print job to be printed before a second print job, the first print job to be delivered to another customer than the second print job. Documents produced according to print jobs for one customer may have to be finished, like bundling, parcelling, sealing and stapling, in another way than documents produced according to print jobs for another customer.

According to an embodiment the task for the ejection of the stack comprises a transfer of the stack from an internal output holder of the printing device to an external output holder of the printing device. The internal stack holder may not be reachable by an operator. The operator can only take the stack from the external output holder for further processing.

According to an embodiment the task for the stack ejection comprises a temporary stop of ejecting sheets of print jobs to the output holder as to enable a purposively emptying of the output holder. While the ejection of the sheets has stopped, the operator is able to empty the output holder at the intended moment of stack ejection. The emptying action of the operator is actually the ejection of the stack, i.e. a removal of the stack from the output holder. Stopping of ejection of the sheets may imply that the printing by the printing device is stopped. However, a printing device having a large internal buffer for holding sheets does not have to stop printing, but can just stop the transfer of sheets from the large internal buffer to the output holder.

The present invention also relates to a printing system for printing print jobs on sheets, the print system comprising a printing device, an output holder attached to the printing device configured to hold a stack of sheets printed upon by the printing device, a first receiving means for receiving a print job to be printed on the printing device, a second receiving means for receiving a trigger comprising information for an ejection of the stack to be performed before the start of the printing of the print job residing in the print job schedule or after the print job residing in the print job schedule has been printed, a control unit for controlling the printing of the print job and the ejection of the stack, the control unit maintaining a print job queue for scheduling print jobs and stack ejections, wherein upon receiving the trigger a task for the ejection of the stack is entered at a position in the print job queue, the position determining an intended moment in time of the ejection of the stack corresponding to the information comprised in the trigger.

According to an embodiment the printing system comprises a rule based system comprising ejection rules derived from properties of print jobs residing in the print job queue, the rule base system configured to send the trigger to the second receiving means.

The present invention also relates to a non-transitory recording medium comprising computer executable program code configured to instruct a computer to perform the method according to any of the embodiments of the method according to the present inventions.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE EMBODIMENTS

Figure 1:
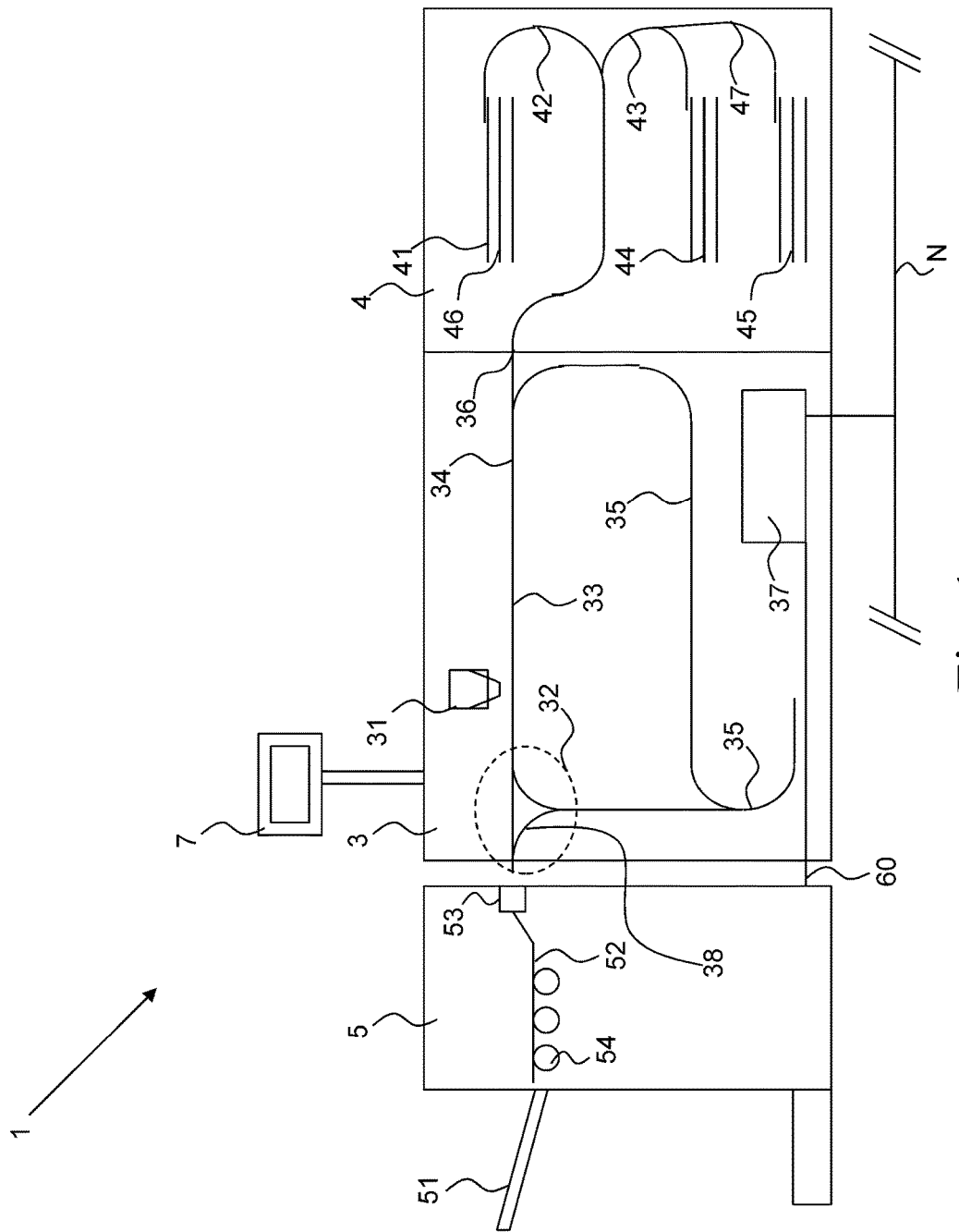
FIG. 1 shows schematically a printing system in which the method according to the present invention is applicable.

A number of embodiments will now be described in conjunction with the drawings, in which same reference numerals refer to like elements.

FIG. 1 shows schematically a printing system 1 in which the method according to the present invention is applicable. The printing system 1, for purposes of explanation, is divided into an output section 5, a print engine and control section 3, a local user interface 7 and an input section 4. While a specific printing system is shown and described, the disclosed embodiments may be used with other types of printing system such as ink jet, electrographic, etc.

The output section 5 comprises at least one output holder 52 for holding printed image receiving material. The printed image receiving material is transported from the print engine and control section 3 via an inlet 53 to the output section 5. When a stack ejection command is invoked by the control unit 37, guiding means 54 are activated in order to eject the stack on the output holder 52 outwards to an external output holder 51. The operator can take the stack from the external output holder 51 for further processing the outputted documents in the stack. Finishing equipment may be added to or replace the external holder 51 for further finishing the ejected stack. The internal output holder 52 may not be reachable by an operator. In the latter case the operator cannot take the stack from the internal output holder 52 for further processing, but he can only take the stack from the external output holder 51 for further processing.

According to an alternative embodiment (not shown) the task for the stack ejection comprises a temporary stop of ejecting sheets of print jobs to an external output holder in the print job queue in order to enable a purposively emptying of the output holder according to the present invention. While the ejection of the sheets has stopped, the operator is able to empty the output holder at the intended moment of stack ejection. The emptying action of the operator is actually the ejection of the stack. Stopping of ejection of the sheets may imply that the printing by the printing device is stopped. However, a printing device having a large internal buffer for holding sheets does not have to stop printing, but can just stop the transfer of sheets from the large internal buffer to the output holder.

According to an alternative embodiment (not shown) the printing system comprises a first output holder and a second output holder and sheets are automatically transferred to the second output holder when the first output holder has to be emptied.

The output section 5 is digitally connected by means of a cable 60 to the print engine and control section 3 for bi-directional data signal transfer.

The print engine and control section 3 comprises a print engine and a control unit 37 for controlling the printing process. The control unit is a computer or server or a workstation, connected to the print engine and connected to the digital environment of the printing system, for example a network N for transmitting a submitted print job to the printing system. In FIG. 1 the control unit 37 is positioned inside the print engine and control section 3, but the control unit 37 may also be positioned outside the print engine and control section 3 in connection with the network N. The print engine comprises a print head or print assembly 31 for ejecting and/or fixing marking material to image receiving material and a paper path 34, 32, 35 for transporting the image receiving material from an entry point 36 of the print engine and control section 3 to the inlet 53 of the output section 5. The print head or print assembly 31 is positioned near the paper path section 34. The print head or print assembly 31 may be an inkjet print head, a direct imaging toner assembly or a indirect imaging toner assembly. While an image receiving material is transported along the paper path section 34, the image receiving material receives the marking material from the print head or print assembly 31. A next paper path section 32 is a flip unit for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

When the image receiving material has been printed upon, the image receiving material is transported to the inlet 53 of the output section 5.

The input section 4 may comprise at least one input holder 44, 45, 46 for holding the image receiving material before transporting the sheets of image receiving material to the print engine and control section 3. Sheets of image receiving material are guided from the input holders 44, 45, 46 by guiding means 42, 43, 47 to an outlet 36 for entrance in the print engine and control section 3.

The local user interface is suitable for displaying user interface windows for controlling the print job queue residing in the control unit 37. In another embodiment a computer in the network N has a user interface for displaying and controlling the print job queue of the printing system 1.

Figure 2:
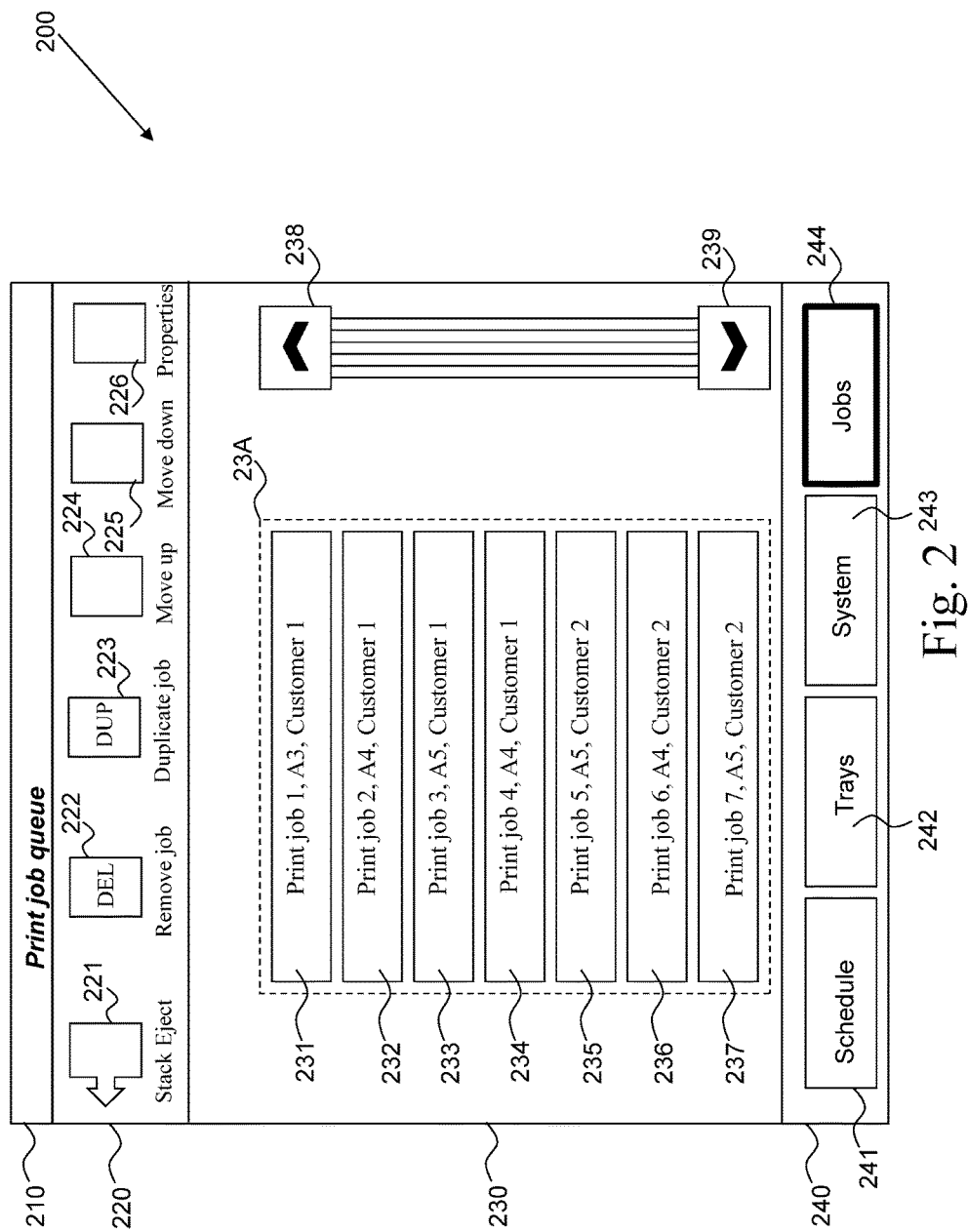
FIGS. 2-4 show schematically user interface windows for representing the print job queue of a printing system according to the method of the invention.

FIG. 2 shows a user interface window 200 of the printing system 1 according to the present invention. In an alternative embodiment part of the functionality—like buttons—of this user interface window is designed as hardware buttons near the user interface window 200. The user interface window 200 is opened at the local user interface 7 in FIG. 1 and shows a representation of the print job queue residing in the control unit 37 in FIG. 1.

The user interface window 200 comprises a title section 210, a user action section 220, a print job queue section 230 and a navigation section 240.

The user action section 220 comprises image items 221-226 to be selected for executing actions on the print job queue 23A in the print job queue section 230.

A first image item 221 represents a stack ejection action according to the present invention. In an alternative embodiment the user action section comprises a first stack ejection image item stack representing a stack ejection action after a selected print job from the print job queue 23A and a second stack ejection image item representing a stack ejection action before a selected print job from the print job queue 23A.

A second image item 222 represents a job removal action.

A third image item 223 represents a job duplication action.

A fourth image item 224 represents a move up action.

A fifth image item 225 represents a move down action.

A sixth image item 226 represents an action to retrieve and display properties of a selected print job in a properties window.

The navigation section 240 comprises a first image item 241 for navigating to a schedule with a timeline and media needed for the print jobs, a second image item 242 for navigating to an overview of the input trays and the content of the input trays, a third image item 243 for navigating to the system settings and a fourth image item 244 for navigating to the print jobs in the print job queue 23A. In the user interface window 200 the fourth image item 244 is selected.

The print job queue section 230 comprises a representation of the print job queue 23A. The print job queue 23A comprises at least one print job. FIG. 2 shows a plurality of print jobs 231-237 in the print job queue 23A in a sequence order from top to bottom. A first print job 231 will be printed real soon after the print job that is currently printed by the printing device is ready. A last print job 237 will be printed if the preceding print jobs 231-236 are ready. Each print job 231-237 in the print job queue 23A is selectable by a mouse or by a finger or stylus in case of a touch screen. A sequence order of the print jobs 231-237 in the print job queue 23A may be changed by selecting a print job in the print job queue 23A and then activating the fourth image item 224 or the fifth image item 225 in order to move the selected print job one position up or down respectively in the print job queue 23A. In a further embodiment in case of a touch screen a position of a print job 231-237 in the print job queue 23A may be changed by dragging and dropping the appropriate print job to another position in the print queue. The print job queue 23A is scrollable by activating an upward scrolling button 238 or a downward scrolling button 239. Each print job 231-237 in the print job queue 23A may be displayed with a number of properties of the print job, such as an identifying name of the print job ("Print job 1"), a size of the image receiving material to be used for the print job ("A3"), a customer name corresponding to the customer where the print job has to be delivered "Customer 1", etc. For convenience reasons a small relevant number of properties for each print job 231-237 is displayed in the print job queue 23A.

A use of the first image item 221 representing the stack ejection action according to the present invention will be further elucidated hereinafter. The operator is able to select a print job from the print job queue 23A. After the selection of the print job the operator may activate the first image item 221. By activating the first image item 221 an ejection of the stack from the output holder is planned after the selected print job.

By means of a number of examples advantageous planning of the ejection of the stack is described hereinafter.

In a first example the operator has noticed that the first four print jobs 231-234 have to be delivered to a first customer ("Customer 1"), while the last three print jobs 235-237 have to be delivered to a second customer ("Customer 2"). Therefore the operator may want to have an ejection of the stack after the fourth print job 234, the last print job for the first customer, and before the fifth print job 235, the first print job for the second customer. The operator selects the fourth print job 234 and activates the first image item 221. The result of this action is shown in FIG. 3.

Figure 3:
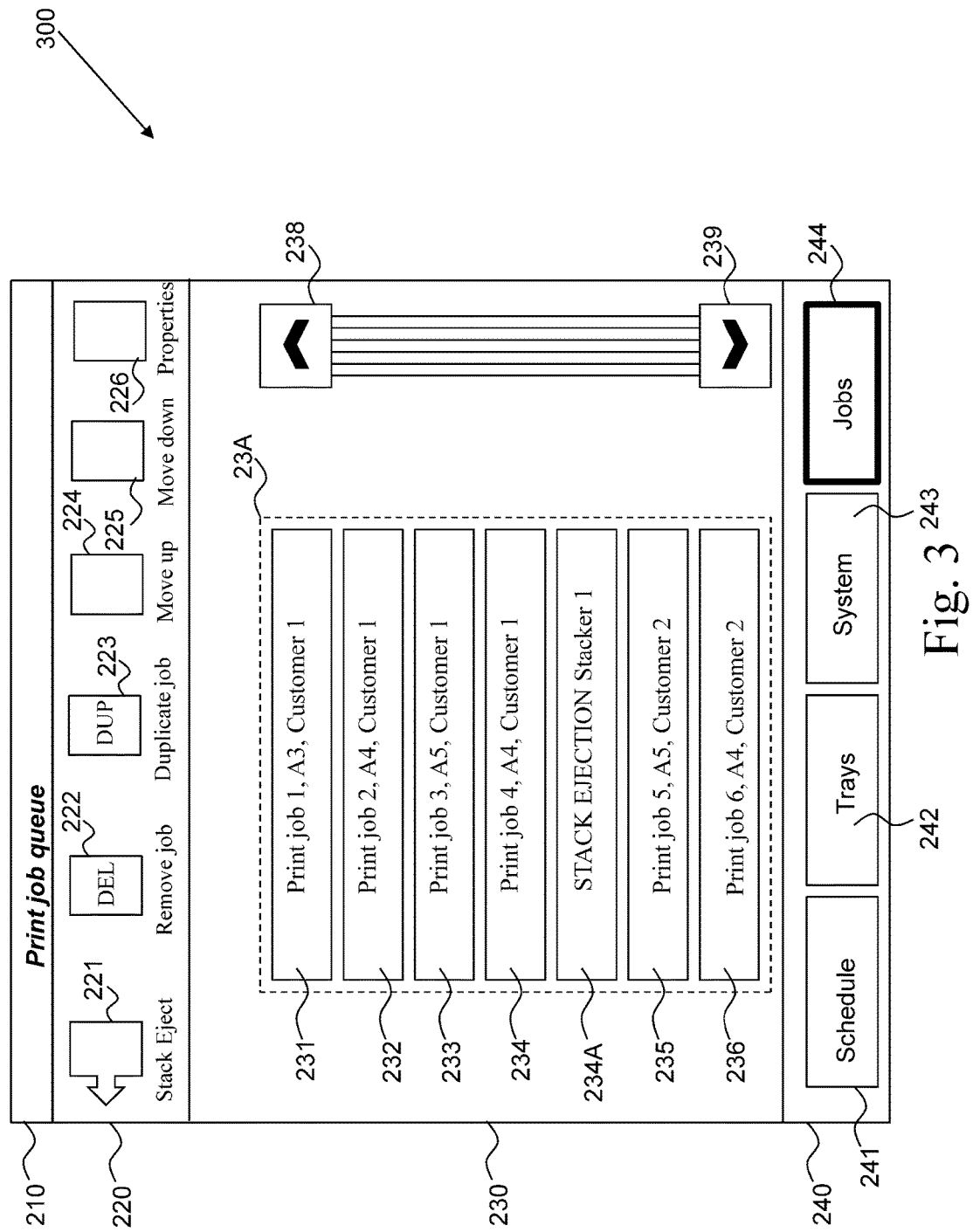

FIG. 3 shows in a window 300 a task image item 234A for a stack ejection of a first output holder ("Stacker 1") of the printing system according to the present invention. The task image item 234A is positioned in the representation of the print job queue 23A between the fourth print job 234 and the fifth print job 235.

In an embodiment of the present invention the sixth image item 226 is used for retrieving and changing of properties of a selected print job in the print job queue 23A and is also used for retrieving and changing of properties of a selected stack ejection, e.g. the properties of the task image item 234A. A property of the task image item 234A may be the identification of the output holder. This is in particular advantageous in case of more than one output holder. For example, the planned stack ejection may be changed from a stack ejection of the first output holder "Stacker 1" into a stack ejection from a second output holder—for example "Stacker 2"—by means of the activation of the sixth image item 226 after selection of the task image item 234A. For example, proof print jobs are delivered to a top output holder of the printing system 1 and a stack ejection may be planned after a proof print job has been printed.

In another embodiment the properties of an item 231-236, 234A in the print job queue 23A are displayed after double clicking or double tapping on the item.

In general the task image item 234A—when displayed in the print job queue 23A—may be selected by a mouse of by a touch on the task image item 234A. The selected task image item 234A may be moved along the print job queue 23A by a mouse movement, by a drag-and-drop action in case of a touch screen or by means of the fourth image item 224 ("move up") and/or the fifth image item 225 ("move down") in order to change the moment of stack ejection with respect to the print jobs 231-237 in the print job queue 23A.

The task image item 234A is displayed in the form of a bar. Other shapes may be envisioned like a flag icon before a print job item 231-236, a flag icon after a print job item 231-236, a modified print job item 231-236 with an upper corner provided with an icon to represent a stack ejection before the print job corresponding to the print job item, a modified print job item 231-236 with an lower corner provided with an icon to represent a stack ejection after the print job corresponding to the print job item, etc.

In a second example the operator has noticed that the first three print jobs 231-233 have a size property, "A3", "A4", "A5", respectively which sizes are in a decreasing order. The stack of the first three print jobs 231-233 will therefore form a kind of pyramidal stack since the later print job will end up on top of the previous print job. Print jobs in such a pyramidal stack are easy visible and easy to process. The fourth job 234 has a size property of "A4", which is larger than the size "A5" of the preceding print job 233. Therefore the operator may want to have an ejection of the stack after the third print job 233 and before the fourth print job 234. The operator selects the third print job 233 and activates the first image item 221. The result of this action is shown in FIG. 4.

Figure 4:
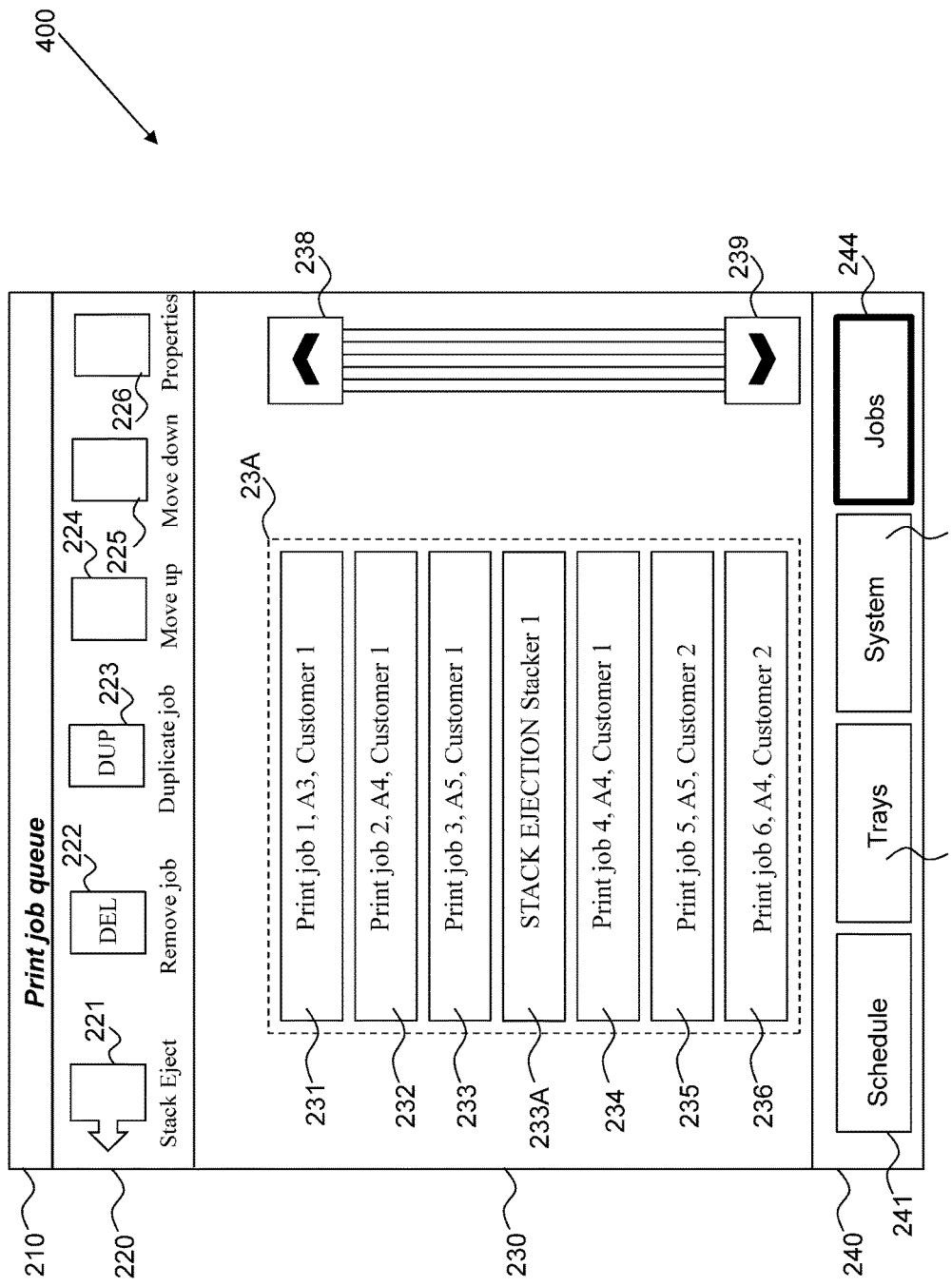

FIG. 4 shows in a window 400 a task image item 233A for a stack ejection of a first output holder ("Stacker 1") of the printing system according to the present invention. The task image item 233A is positioned in the representation of the print job queue 23A between the third print job 233 and the fourth print job 234.

According to the same principle of pyramidal stack ejection a stack ejection according to the present invention may also be inserted after the fifth print job 235 and before the sixth print job 236.

The first example and the second example may be combined. The first example and the second example show stack ejections 234A, 233A respectively planned by the operator and based on the properties of the print jobs 231-237 in the print job queue 23A. According to an embodiment the criteria employed by the operator may be encoded in software for a rule base system comprising rules for a stack ejection based on the properties of the print jobs in the print job queue of the printing system. The rule based system may be part of the control unit of the printing system according to the present invention. The application of the rules in the rule based system leads to an automatic stack ejection without intervention of the operator via one of the windows 200, 300, 400 shown in FIG. 2, FIG. 3 and FIG. 4 respectively.

Figure 5:
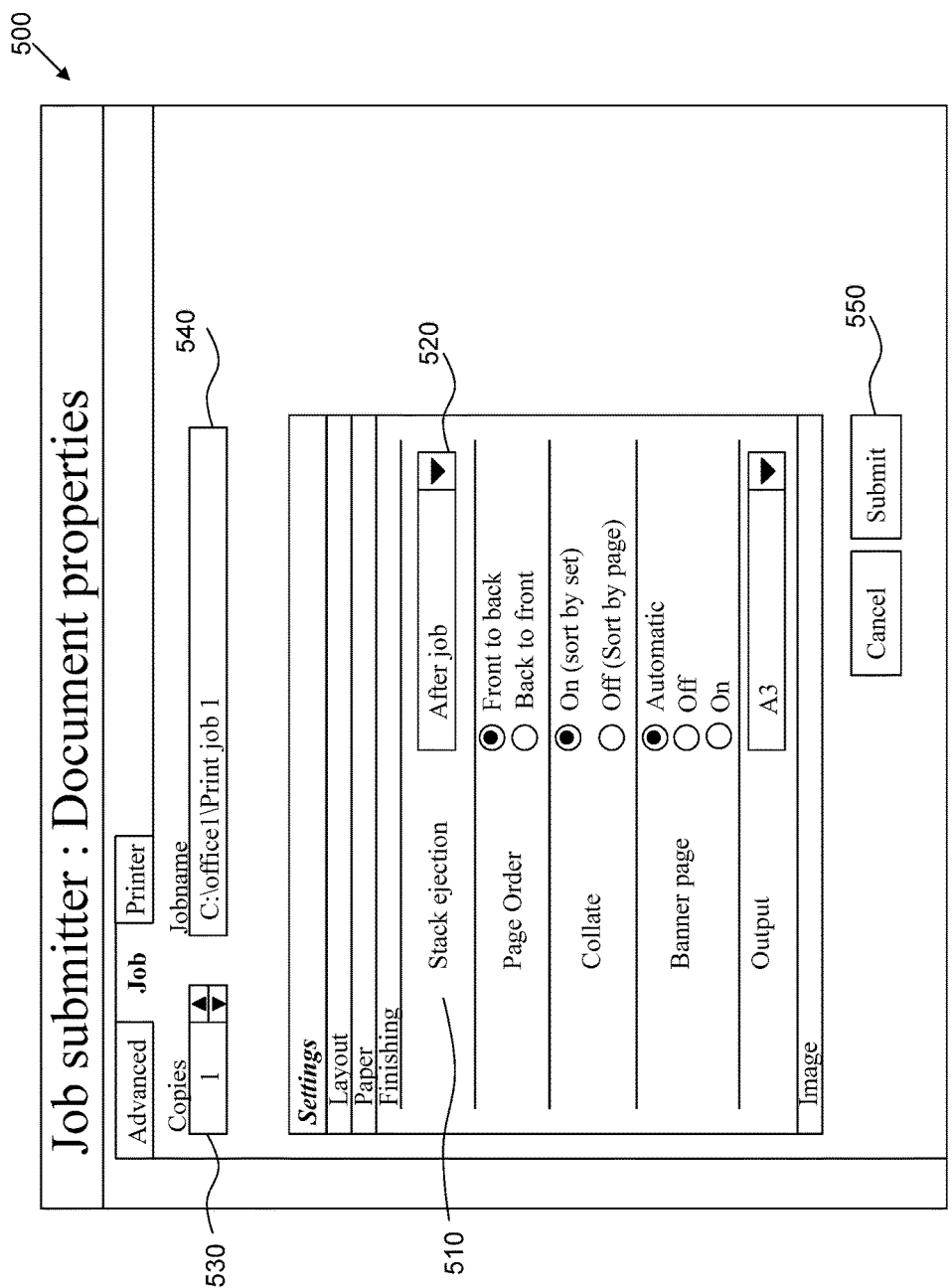
FIG. 5 shows schematically a user interface window of a job submitter for submitting a print job to the printing system according to the method of the invention.

FIG. 5 shows a window 500 of a job submitter for submitting print jobs to the printing device. The job submitter may be part of a pre-processing application or a printer driver. The pre-processing application may comprise a hot folder mechanism for receiving document files in a hot folder and automatically retrieving the document files subsequently from the hot folder in order to transmit the document files subsequently to the printing device.

FIG. 5 shows a window 500 comprised in a printer driver application.

From three tabs "Advanced", "Job", "Printer", the second tab "Job" is selected.

A number of copies may be selected in a first entry field 530. A job name may be entered in a second entry field 540. A plurality of settings may be set for a layout of the print job and media of the print job. Image parameters and finishing parameters may be set. The finishing parameters are selected and expanded. Finishing parameters concern a page order, a collate option, a banner page option and an output option. According to the present invention one of the finishing parameters is a stack ejection option 510 for defining an ejection of the stack before or after the print job. In a selection box 520 an option "After job" is selected, meaning that after this print job has been printed a stack ejection will take place. Another option is "Before job" (not shown), meaning that before this print job is started to be printed a stack ejection will take place or before printed sheets of this print job arrive at the output holder. Another option is "Before job and after job" (not shown), meaning that before this print job is started to be printed a stack ejection will take place and after this print job has been printed a stack ejection will take place. Another option is "No stack ejection" (not shown), meaning that before as well as after this print job no stack ejection will take place. Another option is "Unspecified" (not shown), meaning that no stack ejection is specified according to the stack ejection option 510 in the window 500, but the control unit of the printing device determines a moment of stack ejection via a rule based system or the operator determines a moment of stack ejection via the user interface displaying the print job queue (See FIG. 2). In the case of the use of a rule based system the stack ejection option of "No stack ejection" may be interpreted by the control unit as no stack ejection despite any existing stack ejection rule in the rule based system which rule relates to the same moment before or after the print job, i.e. a stack ejection is prohibited before and after the print job.

The stack ejection option 510 is displayed in the form of a selection drop-down box. Other forms of the stack ejection option may be envisioned, for example a set of radio buttons.

The selected print job in the second entry field 540 has a job name "print job 1". The print job named "print job 1" may be submitted to the printing device by means of the submit button 550.

Figure 6:
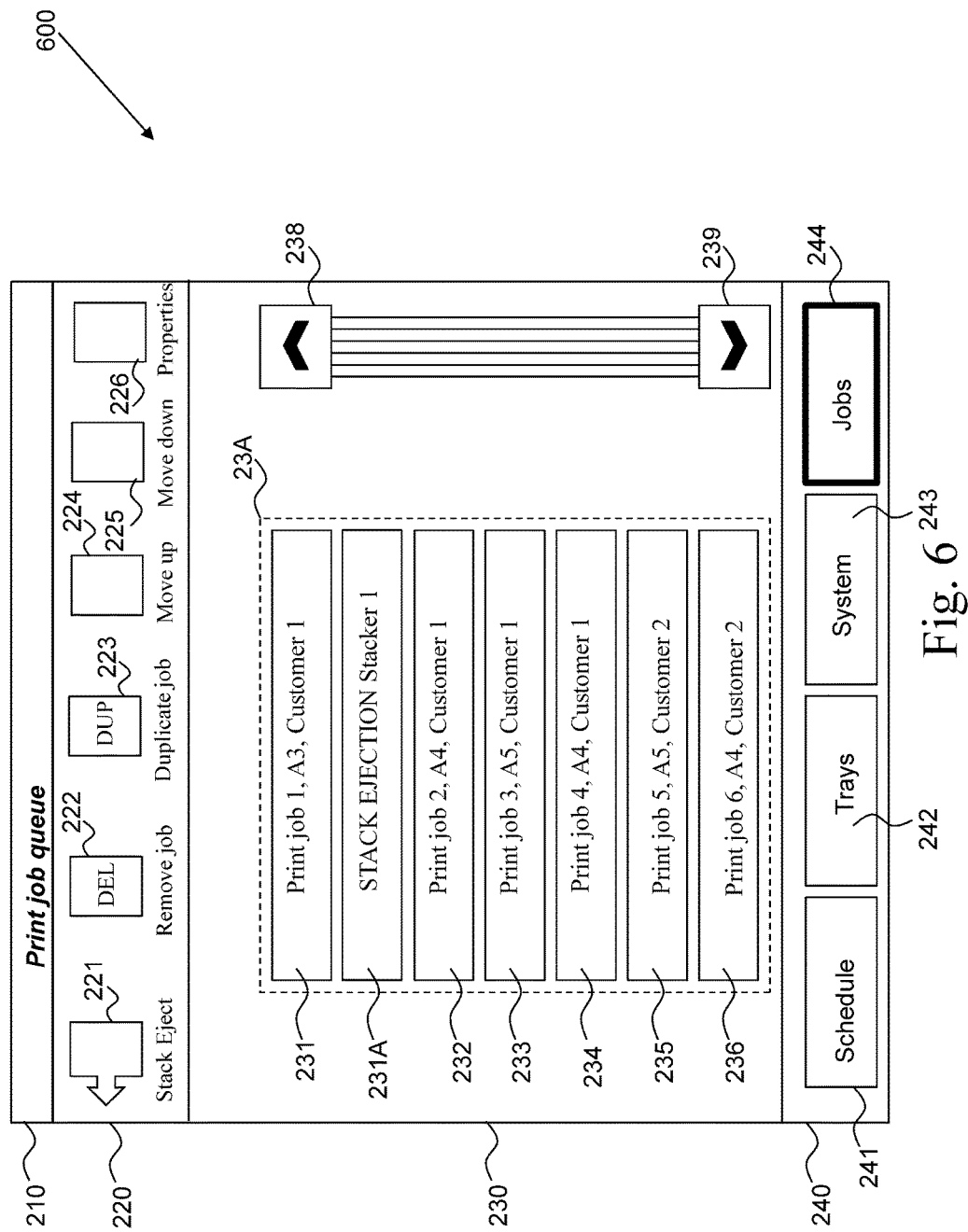
FIG. 6 shows schematically a user interface windows for representing the print job queue of the printing system according to the method of the invention.

Assuming that after the "print job 1" is submitted to the printing device, five other print jobs, named "print job 2" up to "print job 6", are also submitted, each of these five other print jobs having the stack ejection option "No stack ejection", the print job queue will contain at least six print jobs and one stack ejection task as shown in FIG. 6. After the first print job 231 a task 231A for an ejection of the stack is scheduled in the print job queue 23A. After the stack ejection task 231A, the other five print jobs 232-236 are scheduled in the print job queue 23A.

Figure 7:
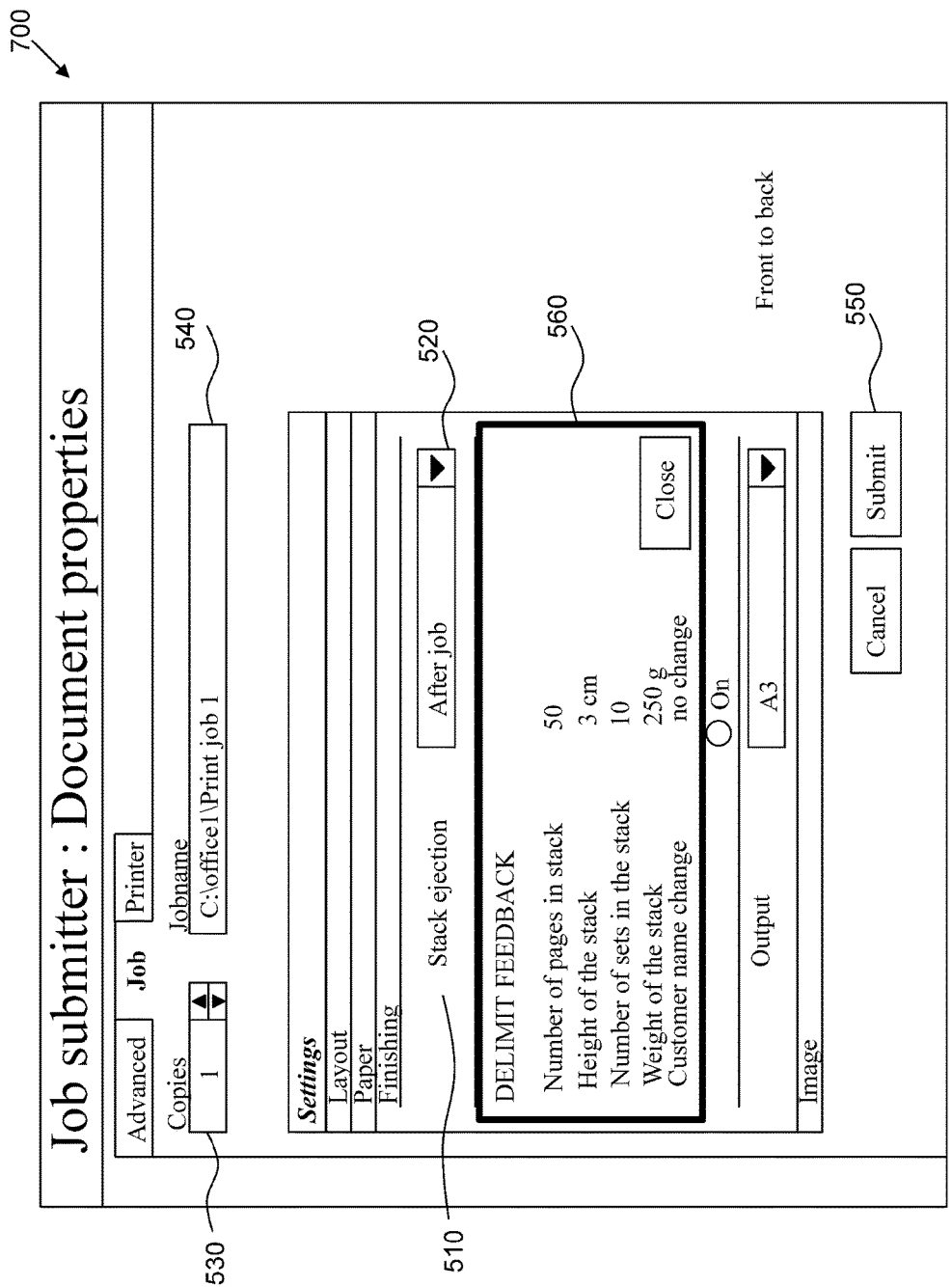
FIG. 7 shows schematically the user interface window of the job submitter provided with a feedback window according to the method of the invention.

FIG. 7 shows a window 700 of the job submission application after the print job named "print job 1" has been submitted by means of the submit button 550. After the submission a first feedback window 560 is displayed. The first feedback window 560 shows first feedback regarding the intended moment in time of the ejection of the stack after the print job named "print job 1" has been printed. The provided first feedback may comprise information of a predetermined number of sheets in the stack at the intended moment in time of ejection of the stack, a predetermined height of the stack at the intended moment in time of ejection of the stack, a predetermined number of print jobs in the stack at the intended moment in time of ejection of the stack, a predetermined number of sets of a print job in the stack at the intended moment in time of ejection of the stack, a predetermined weight of the stack at the intended moment in time of ejection of the stack, a change of a customer name property among the print jobs in the stack at the intended moment of ejection of the stack, or a maximum size of the sheets in the stack.

The first feedback window 560 mentions the number of sheets in the stack (50), a height of the stack (3 cm), a number of sets of a print job in the stack (10), a weight of the stack (250 g), a customer name change "no change". The number of sheets in the stack and the maximum size of the sheets in the stack may be of interest for further finishing of the stack. The height of the stack may be of interest for further packaging the stack, for example in a box which has a predetermined height. The weight of the stack may be of interest for further shipping cost of the stack and/or of interest for working conditions of the operator.

The first feedback is generated by retrieving from the control unit information about planned print jobs and planned stack ejections in the print job queue. The submitted print job may invoke an information request for the control unit to gather this information and send it back to the job submitter application.

The first feedback window 560 may already pop up before the submission of the print job named "print job 1" when a stack ejection option in the selection box 520 is changed. Such a change of the stack ejection option may result in sending the information request as mentioned hereinbefore from the job submitter to the control unit of the printing device.

According to an embodiment the method of the invention comprises the step of changing the intended moment in time of the ejection of the stack in the print job queue by moving the second visual object to another position in the print job queue. Starting point is the print job queue as visually represented in FIG. 6. The operator has noticed that the output holder is not yet full and wants to change the moment of stack ejection from a moment of stack ejection after the first print job 231 into a moment of stack ejection after the second print job 232. Therefore the operator moves the stack ejection task item 231A by means of drag-and-drop or by means of mouse dragging or by means of selection and the move down image item 225 to a position after the second print job 232 and before the third print job 233. The result of the movement is shown in FIG. 8.

Figure 8:
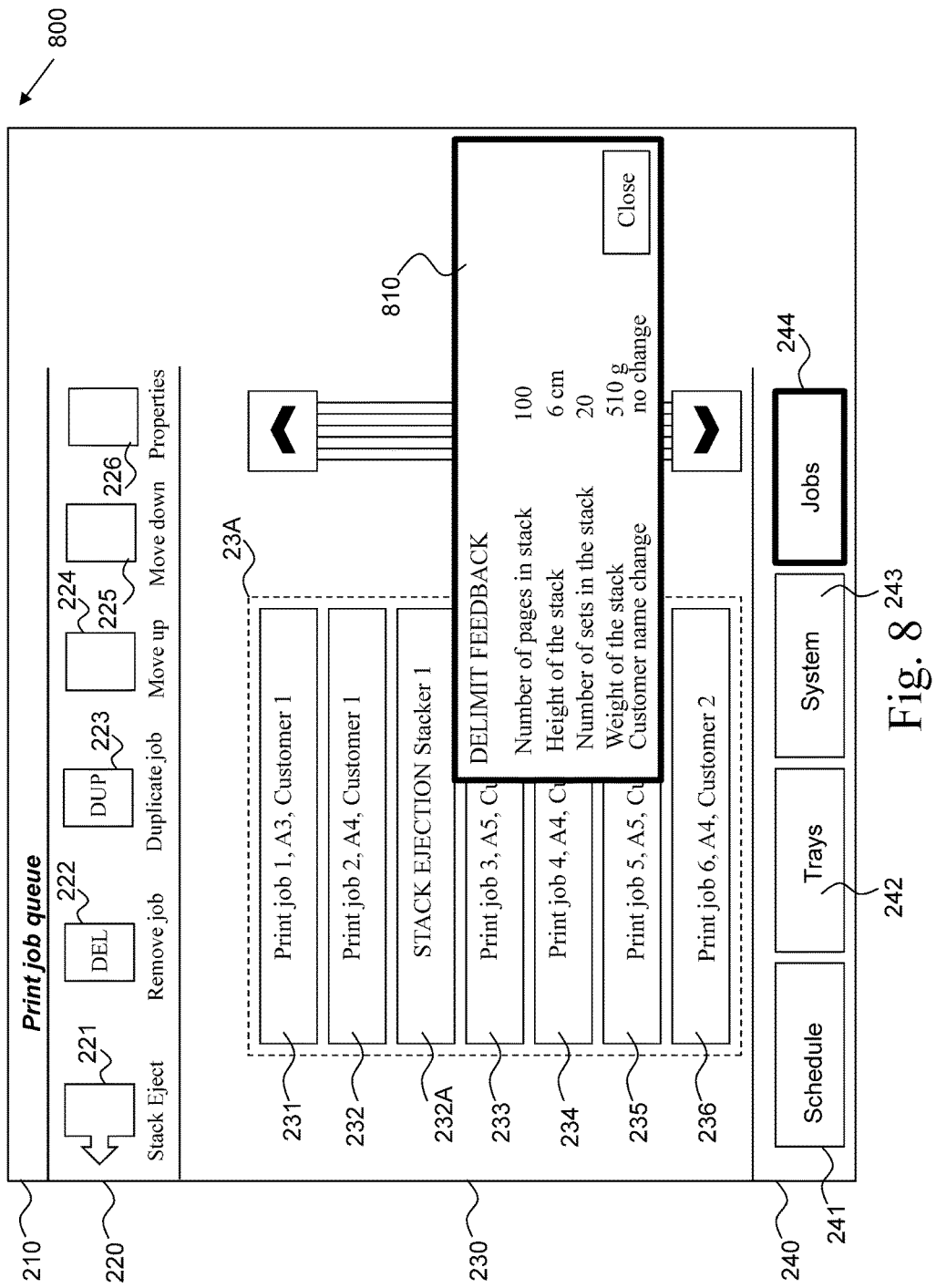
FIG. 8 shows schematically the user interface window of the print job queue provided with a feedback window according to the method of the invention.

FIG. 8 shows the stack ejection task item 232A as a result of the movement of the moment of stack ejection in FIG. 6, after the second print job 232. According to an embodiment the method of the invention provides second feedback regarding the changing of the intended moment in time of the ejection of the stack. The second feedback is displayed in FIG. 8 in a second feedback window 810 near the stack ejection task item 232A. The information of the stack ejection feedback in the second feedback window 810 is accordance with the moment of the planned stack ejection after the second print job 232. The second feedback may comprise information of at least one out of a predetermined number of sheets in the stack at the intended moment in time of ejection of the stack, a predetermined height of the stack at the intended moment in time of ejection of the stack, a predetermined number of print jobs in the stack at the intended moment in time of ejection of the stack, a predetermined number of sets of a print job in the stack at the intended moment in time of ejection of the stack, a predetermined weight of the stack at the intended moment in time of ejection of the stack, a change of a customer name property among the print jobs in the stack at the intended moment of ejection of the stack, and a maximum size of the sheets in the stack at the intended moment of ejection of the stack.

Figure 9:
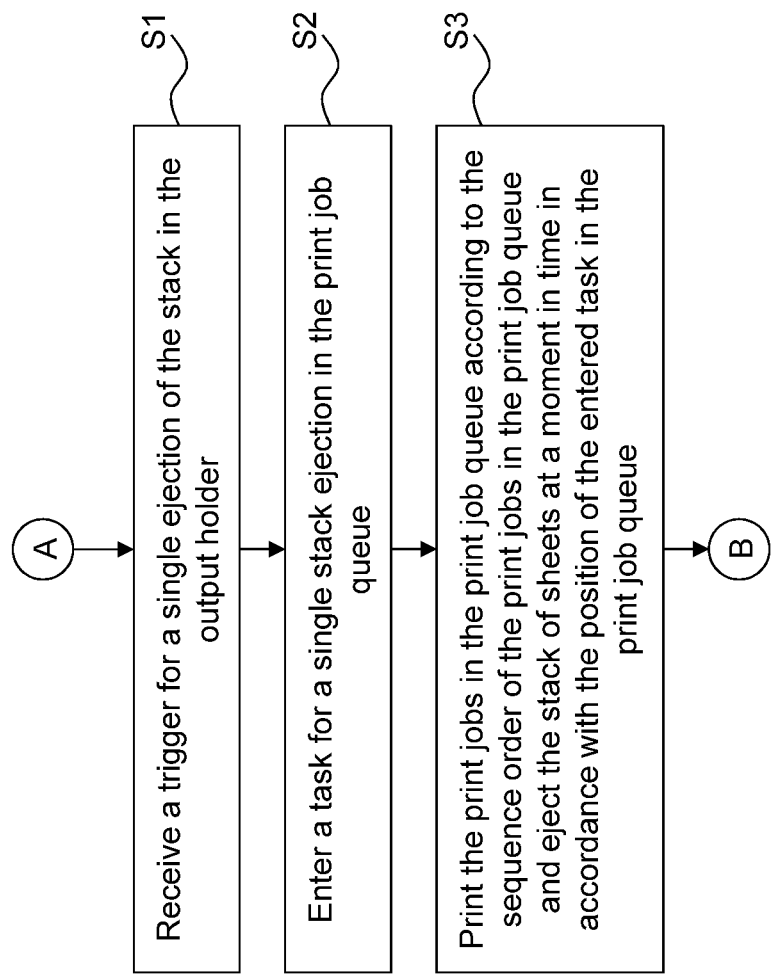
FIG. 9 shows a flow diagram of a method according to the present invention.

FIG. 9 shows a flow diagram of an embodiment of the method according to the present invention. A starting point A leads to the first step S1.

In a first step S1 of the method a trigger is received by the control unit of the printing device. The trigger comprises information for an ejection of the stack for another reason than a full output holder. The stack ejection should be performed before the start of the printing of a print job residing in the print job queue or after the print job residing in the print job queue has been printed. The trigger may be originated from a job submitter or from the use of a stack ejection button or a stack ejection image item on a user interface screen displaying the print job queue.

In a second step S2 a task for the ejection of the stack is entered at a position in the print job queue. The position is selected and determines an intended moment in time of the ejection of the stack corresponding to the information comprised in the trigger. The entering of the task is done automatically by the control unit of the printing device In a third step S3 the print jobs in the print job queue are printed according to the sequence order of the print jobs in the print job queue and the stack of sheets is ejected at a moment in time in accordance with the position of the entered task in the print job queue.

The method ends in an end point B.

The skilled person will recognize that other embodiments are possible within the scope of the appended claims.

The invention claimed is:

1. A method for ejecting a stack of sheets from an output holder attached to a printing device, the output holder configured to hold a stack of sheets printed upon by the printing device according to a plurality of print jobs submitted to the printing device, the printing device comprising a control unit for controlling the receiving of the plurality of print jobs in a print job queue and the printing of the plurality of print jobs according to the print job queue, the method comprising the steps of receiving a trigger via a user action on a user interface for the printing device, the trigger comprising information for an ejection of the stack for another reason than a full output holder, the stack ejection to be performed before the start of the printing of a print job residing in the print job queue or after the print job residing in the print job queue has been printed, and entering a task for the ejection of the stack at a position in the print job queue, the position determining an intended moment in time of the ejection of the stack corresponding to the information comprised in the trigger, wherein the stack is intended to comprise a plurality of print jobs at the intended moment in time of the ejection of the stack.

2. The method according to claim 1, wherein the method comprises the steps of printing the print jobs according to the print job queue, and ejecting the stack of sheets according to the entered task in the print job queue.

3. The method according to claim 1, wherein the method comprises the step of receiving the trigger from a job submitter for submitting the print job to the printing device.

4. The method according to claim 3, wherein the method comprises the step of providing first feedback in a window being part of the job submitter regarding the intended moment in time of the ejection of the stack.

5. The method according to claim 4, wherein the provided first feedback comprises information of at least one out of a predetermined number of sheets in the stack at the intended moment in time of ejection of the stack, a predetermined height of the stack at the intended moment in time of ejection of the stack, a predetermined number of print jobs in the stack at the intended moment in time of ejection of the stack, a predetermined number of sets of a print job in the stack at the intended moment in time of ejection of the stack, a predetermined weight of the stack at the intended moment in time of ejection of the stack, a change of a customer name property among the print jobs in the stack at the intended moment in time of ejection of the stack, and a maximum sheet size of the stack at the intended moment in time of ejection of the stack.

6. The method according to claim 3, wherein the trigger is a print job ticket comprising a setting for ejection of a stack having a value out of a first value of an ejection of the stack before the printing of the print job, a second value of an ejection of a stack after the printing of the print job, a third value of no ejection of the stack, and a fourth value of an unspecified ejection of the stack.

7. The method according to claim 1, wherein the user interface for the printing device is configured to display the print job queue and the method comprises the steps of displaying the print job queue on the user interface, and receiving the trigger from an action applied to the print job queue displayed on the user interface.

8. The method according to claim 7, wherein the action is a user action.

9. The method according to claim 7, wherein the user interface is configured to display a visual representation of the print job queue, the visual representation comprising a plurality of first visual objects, each first visual object representing a print job in the print job queue, and a second visual movable object representing an ejection of a stack, the method comprising the step of determining the intended moment in time of the ejection of the stack based on a relative position of the second visual object and each of the first visual objects.

10. The method according to claim 9, wherein the method comprises the step of changing the intended moment in time of the ejection of the stack in the print job queue by moving the second visual object to another position in the print job queue.

11. The method according to claim 10, wherein the method comprises the step of providing second feedback regarding the changing of the intended moment in time of the ejection of the stack.

12. The method according to claim 11, wherein the provided second feedback comprises information of at least one out of a predetermined number of sheets in the stack at the intended moment in time of ejection of the stack, a predetermined height of the stack at the intended moment in time of ejection of the stack, a predetermined number of print jobs in the stack at the intended moment in time of ejection of the stack, a predetermined number of sets of a print job in the stack at the intended moment in time of ejection of the stack, a predetermined weight of the stack at the intended moment in time of ejection of the stack, a change of a customer name property among the print jobs in the stack at the intended moment of ejection of the stack, and a maximum size of the sheets in the stack at the intended moment in time of ejection of the stack.

13. The method according to claim 9, wherein the user interface is configured to display an eject button and the method comprises the steps of selecting a print job from the print job queue, activating the eject button, entering the task for the ejection of the stack after the selected print job in the print job queue, displaying the second visual movable object in the visual representation of the print job queue after the first visual object representing the selected print job.

14. The method according to claim 1, wherein the method comprises the step of receiving the trigger from a local user interface being part of the output holder.

15. The method according to claim 1, wherein the method comprises the step of receiving the trigger from a rule based system comprising ejection rules derived from properties of the print jobs residing in the print job queue.

16. The method according to claim 15, wherein each ejection rule of the rule based system has a setting out of an activation option of the rule, a deactivation option of the rule and an advice option of the rule, wherein the user interface provides an advice for an ejection of the stack if the setting of the advice option is set for the rule.

17. The method according to claim 15, wherein the rule based system supports an ejection rule that an ejection is to be scheduled between a first print job to be printed before a second print job, the first print job having a smaller format than the second print job.

18. The method according to claim 15, wherein the rule based system supports an ejection rule that an ejection is to be scheduled between a first print job to be printed before a second print job, the first print job to be delivered to another customer than the second print job.

19. The method according claim 1, wherein the task for the ejection of the stack comprises a transfer of the stack from an internal output holder of the printing device to an external output holder of the printing device.

20. The method according to claim 1, wherein the task for the stack ejection comprises a temporary stop of ejecting sheets of print jobs to the output holder as to enable a purposively emptying of the output holder.

21. A non-transitory recording medium comprising computer executable program code configured to instruct a computer to perform the method according to claim 1.

22. Printing A printing system for printing print jobs on sheets, the print system comprising a printing device, an output holder attached to the printing device configured to hold a stack of sheets printed upon by the printing device, a first receiving means for receiving a print job to be printed on the printing device, a user interface configured to receive a trigger via a user action on the user interface, the trigger comprising information for an ejection of the stack to be performed before the start of the printing of the print job residing in the print job schedule or after the print job residing in the print job schedule has been printed, and a control unit for controlling the printing of the print job and the ejection of the stack, the control unit maintaining a print job queue for scheduling print jobs and stack ejections, wherein the control unit is configured to enter, upon receiving the trigger from the user interface, a task for the ejection of the stack at a position in the print job queue, the position determining an intended moment in time of the ejection of the stack corresponding to the information comprised in the trigger, and wherein the stack is intended to comprise a plurality of print jobs at the intended moment in time of the ejection of the stack.

23. The printing system according to claim 22, wherein the printing system comprises a rule based system comprising ejection rules derived from properties of print jobs residing in the print job queue, the rule base system configured to send the trigger to the second receiving means.

* * * * *